Figure 1:
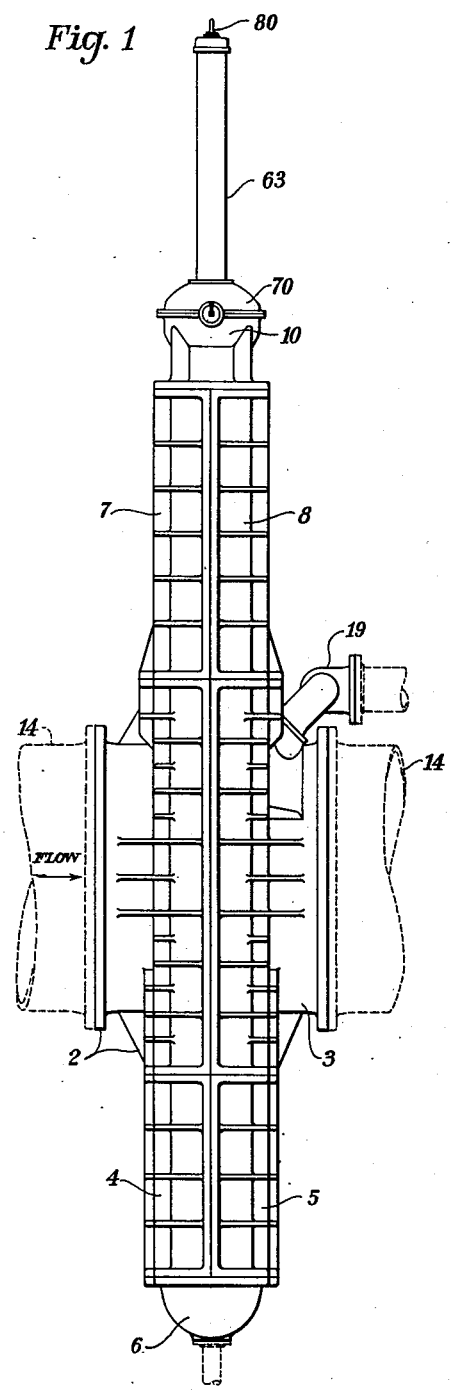

Sept. 27, 1938.  P. A. KINZIE ET AL  2,131,053
GATE VALVE
Filed Oct. 10, 1936  4 Sheets-Sheet 1

INVENTORS.
Phillip A. Kinzie
Warren H. Kohler
BY
ATTORNEY.

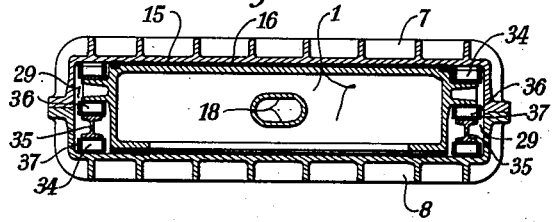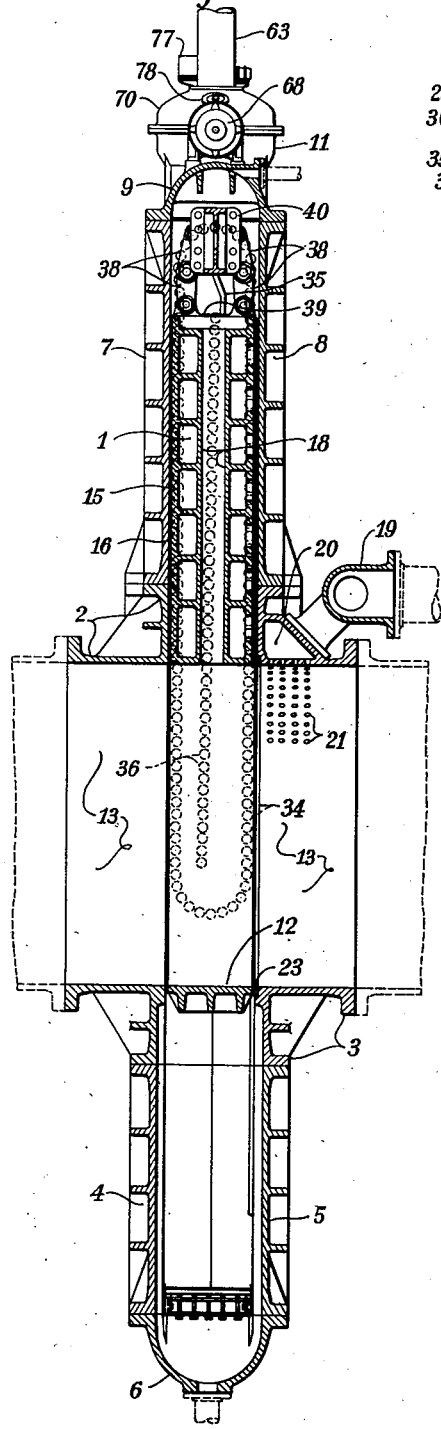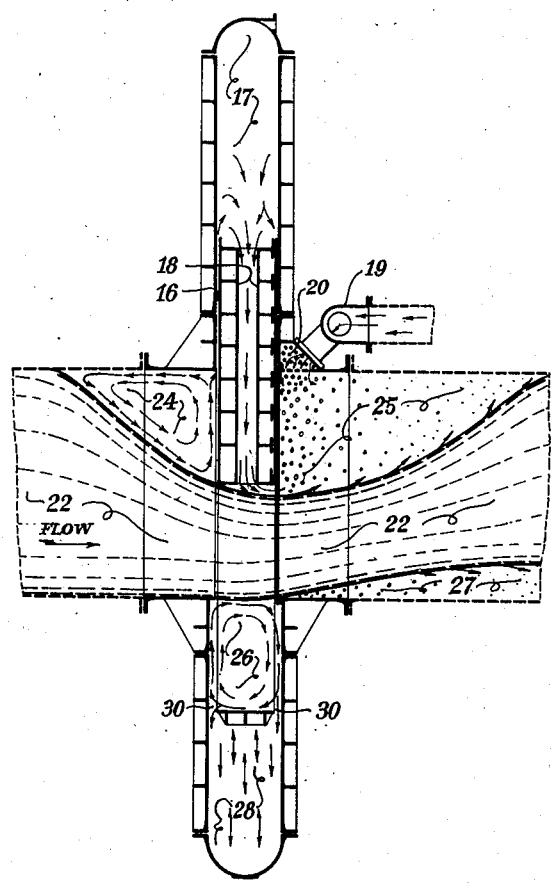

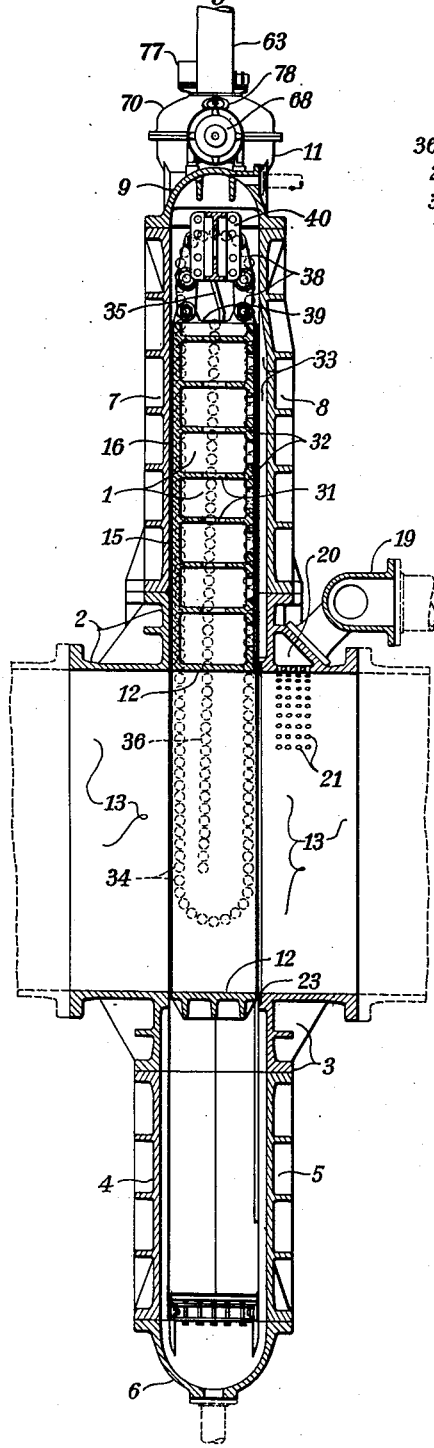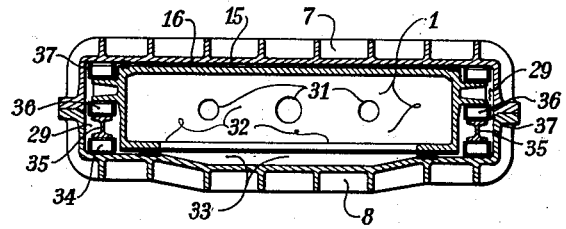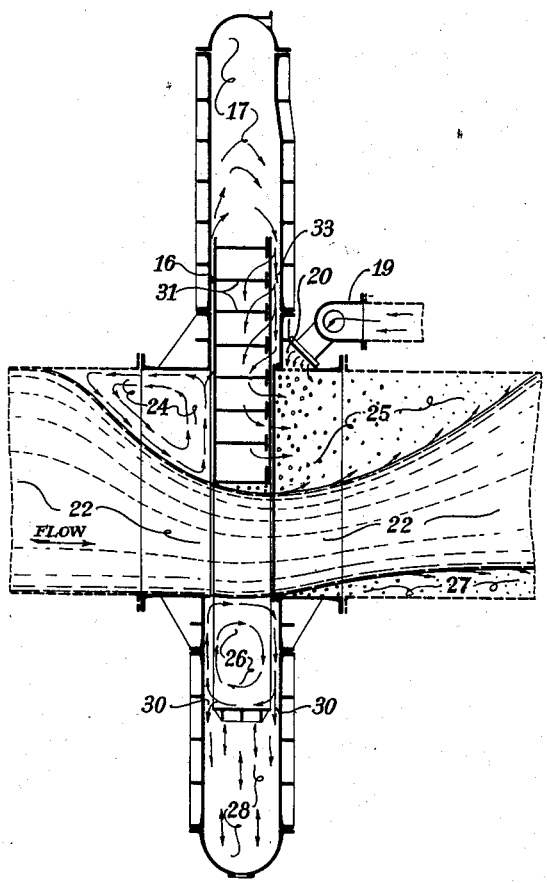

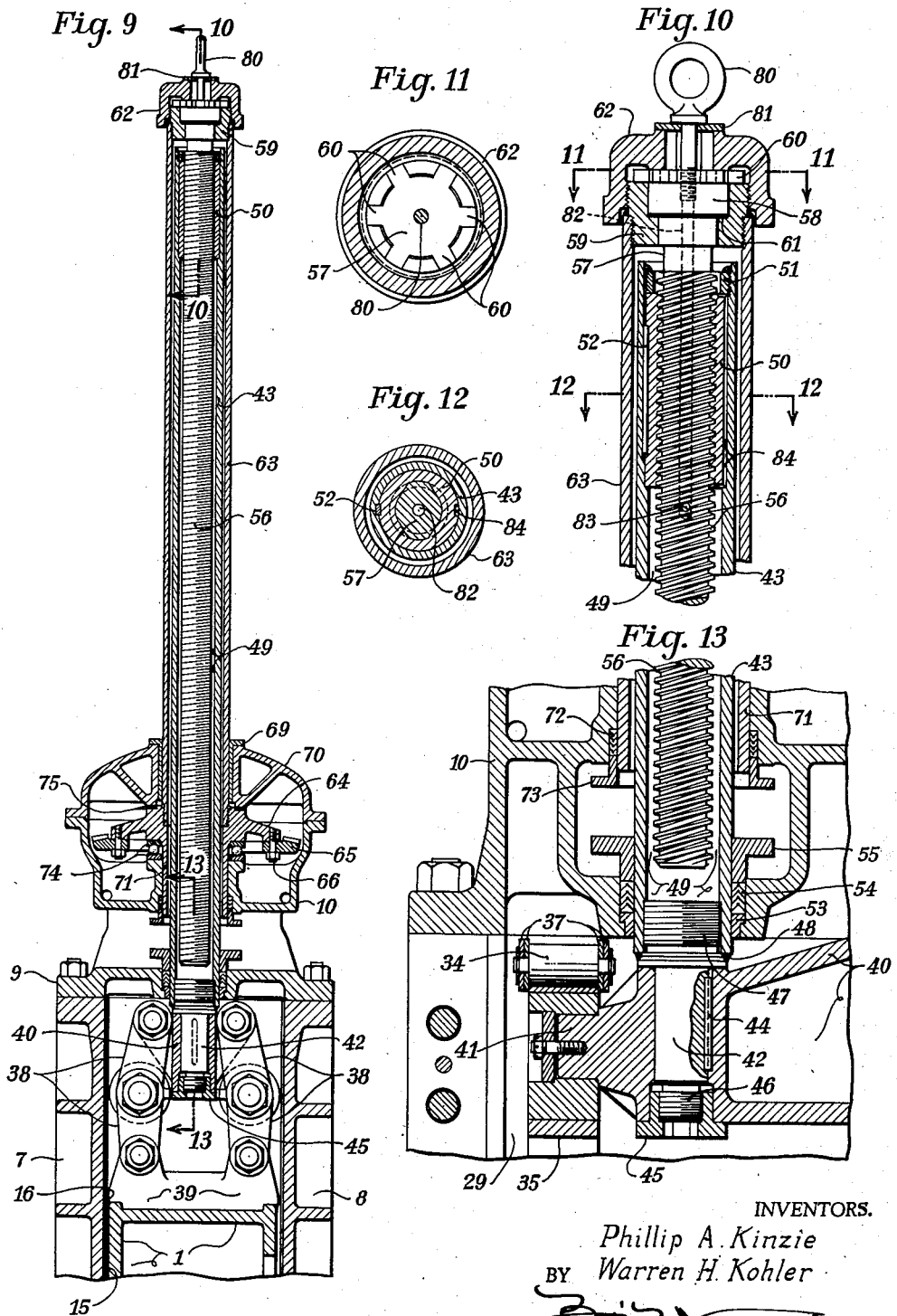

Patented Sept. 27, 1938

2,131,053

UNITED STATES PATENT OFFICE 2,131,053

GATE VALVE

Phillip A. Kinzie and Warren H. Kohler, Denver, Colo., assignors to Universal Hydraulic Corporation, Denver, Colo., a corporation of Colorado Application October 10, 1936, Serial No. 105,077

8 Claims. (Cl. 251—51)

In general, this application relates to improvements on gates, which are used to interrupt the flow of a fluid through a passageway, by means of a vertically rising closure member. While the embodiment illustrated herein shows a roller-mounted gate with a cylindrical follower ring, it is, nevertheless, to be understood that the balancing principle disclosed herein is equally applicable to analogous types of gates, whether they be roller-mounted or not, and whether the fluidway be circular or some other shape. Too, from subsequent description it will be apparent that the presence of a follower cylinder or some such equivalent member is not essential to the functioning of our invention.

In particular, this invention relates to a method of hydraulically balancing the vertical forces induced by fluid flow beneath a leaf or closure member within an encasing housing, and to a means for raising or lowering said leaf or closure member by means of encased non-rising stem elements. Gates employing the principle of seating as well as numerous other features illustrated herein have been disclosed in patent applications filed by Phillip A. Kinzie, February 8, 1933 (Serial No. 655,803) and by Phillip A. Kinzie et al., filed December 28, 1935 (Serial No. 56,418); therefore, the function of analogous elements, illustrated on this application, will not be described in detail.

When gates of the general type disclosed herein are being closed or opened with fluid passing through the fluidway, because of their inherent features of construction, they tend to be drawn down by the disturbance of hydrostatic balance on the leaf or closure member, if proper compensating means therefor are not introduced into the gate structure. The discovery of the unbalances that exist on a leaf or closure member, was made while testing an actual device, and the existence and magnitude of the same had not previously been known.

The device being tested has an eight-inch diameter fluidway and was operated at a hydrostatic pressure of five pounds per square inch. The leaf or closure member, when immersed in water, weighed forty-two pounds; however, during the closure of the leaf with fluid passing through the fluidway, the actual recorded downpull on the stem by which the leaf was raised or lowered was found to be three hundred and twenty pounds. The existence of such a force was both amazing and baffling. It was thought at first that flow beneath the partially closed leaf was producing an impact load on the lower portion of the follower ring. A least square flow diagram was prepared and computations were made therefrom, showing that the change in direction of fluid flow would produce a downward force on the leaf substantially in accord with the recorded downpull, which was revealed by the tests. It was believed then that a solution had been found; however, subsequent tests that were made after the lower half of the follower ring had been honeycombed with holes for allowing equalization of pressures on the inner and outer surface thereof, the downward pull was found not to be materially decreased, proving that some cause, as yet unsuspected, was producing the undesirable condition.

There followed a series of trials and failures; however, when after a very careful study the scheme for balancing the vertical forces as depicted herein was incorporated into the device being tested, the downpull was entirely nullified leaving only the weight of the leaf, forty-two pounds, to be raised or lowered. From this citation of the tests performed on the device, it will be apparent that in a gate having a one hundred inch diameter opening and operating under a hydrostatic pressure of one hundred pounds per square inch, the downpull would reach proportions requiring enormous hoists and very heavy stems and connections to the gate leaf. Our invention which will be hereinafter described and fully explained will show how we have simply yet adequately overcome this difficulty.

Furthermore, we have provided a novel arrangement which is non-rising in character for the hoisting stems—an arrangement which does not require excessive overhead clearance for the gate installation. For example: The overhead clearance requirement for a gate using the conventional rising stem was nearly twenty-three feet, whereas the clearance required for the same gate using the invention depicted herein was only thirteen feet. In short, we have fulfilled the following defined objectives of the invention:

Our invention has as an object, a means for balancing the vertical pressure forces which are induced by fluid flow against and beneath a vertically operating leaf or closure member within an encasing housing.

Our invention has as an object, a means for balancing the vertical pressure forces which are induced, by fluid contained within and passing through a housing, upon an encased leaf or closure member; said leaf or closure member to be composed of a circular bulkhead element and a cylindrical follower element in juxtaposition.

Our invention has as an object, a means for balancing the vertical pressure forces, which are induced by fluid flow against and beneath a vertically operating leaf or closure member, by providing adequate means of communication between the fluidway and the areas of the encasing housing both above and below the leaf or closure member.

Our invention has as an object, a means for providing adequate communication between the area above the fluidway and leaf member through a communicating tube in the gate leaf, and between the area beneath the fluidway and leaf member by means of increased clearance in the portion of the encasing housing below the fluidway; wherein said means will nullify any tendency for unbalanced forces to form while the leaf or closure member is in partially open position with fluid passing therethrough.

Our invention has as an object, a means embodying increased clearance above and below the fluidway between the leaf or closure member and the encasing housing which, together with holes through the web elements of the several beams comprising the bulkhead element of the leaf, will nullify the tendency for unbalanced forces to form while the leaf or closure member is in partially open position with fluid passing therethrough.

Our invention has as an object, a means for raising or lowering a leaf or closure member within an encasing housing; said means to be external in disposition and non-rising in character.

Our invention has as an object, an arrangement of the elements comprising a hoisting means which will provide an oil reservoir in which the threaded stem element is immersed.

Our invention has as an object, the arrangement of a cylindrical oil reservoir surrounding the hoisting stem; said cylindrical reservoir to be contained within the tubular member by which the gate leaf is raised or lowered.

Our invention has as an object, the disposition of a cylindrical oil reservoir as an integral part of the stem elements, wherein the elements comprising the stem unit prevent, without auxiliary seals or stuffing boxes, the intrusion of corrosive fluid into said oil reservoir.

Our invention has as an object, the encasement of the threaded stem member by an external tube member in such manner as to prevent the intrusion of corrosive fluid to said threaded member without necessitating the employment of packing in any form to prevent such intrusion.

Our invention has as an object, an arrangement of the elements comprising a hoisting means, wherein the threaded stem element will be completely encased and protected against being struck and damaged whether the hoisted element be in the raised or lowered position.

Our invention has as an object, the arrangement of elements comprising a vertical hoisting means, which will require low and constant heights for crane or room clearances.

Our invention has as an object, the combination of elements comprising a fluid interrupting unit which will be more compact in design, more efficient in operation, and more economical to manufacture.

Figure 2:
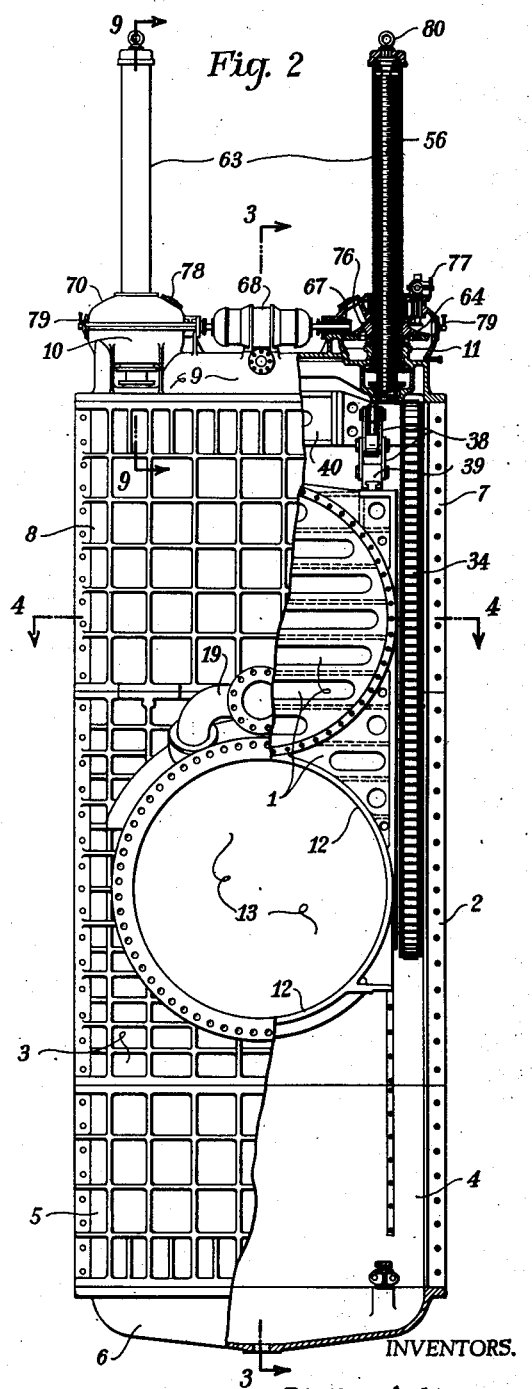

With the foregoing objects in view, and for the purpose of satisfying the patent statutes, there will now be described the specific embodiments of the invention which have been illustrated in the accompanying drawings, forming a part hereof and wherein:

Fig. 1 is a side elevation;
Fig. 2 is a part external and part sectional elevation looking upstream;
Fig. 3 is a section taken on the plane 3—3 of Fig. 2;
Fig. 4 is a section taken on the plane 4—4 of Fig. 2;
Fig. 5 is a diagrammatic sectional elevation simulating conditions of fluid flow that occur within the gate housing with the leaf halfway closed;
Fig. 6 is a sectional elevation of an alternate construction, and is comparable to Fig. 3;
Fig. 7 is a section of an alternate construction, and is comparable to Fig. 4;
Fig. 8 is a diagrammatic sectional elevation for the alternate construction, simulating conditions of fluid flow that occur within the gate housing with the leaf halfway closed, and is comparable to Fig. 5;
Fig. 9 is a section taken on the plane 9—9 of Fig. 2;
Fig. 10 is a section taken on the plane 10—10 of Fig. 9;
Fig. 11 is a section taken on the plane 11—11 of Fig. 10;
Fig. 12 is a section taken on the plane 12—12 of Fig. 10; and
Fig. 13 is a section taken on the plane 13—13 of Fig. 9.

By reference to the accompanying drawings (Figs. 1, 2, and 3) it will be seen that the leaf 1 is encased by the upstream body member 2, downstream body member 3, lower upstream bonnet member 4, lower downstream bonnet member 5, lower bonnet cover 6, upper upstream bonnet member 7, upper downstream bonnet member 8, and the upper bonnet cover 9, into which the hoist cases 10 and 11 are incorporated. With the leaf in the raised position as shown on Figs. 2 and 3, the cylindrical follower element 12 of the leaf 1 coincides with the circular fluidway 13 through the upstream and downstream body members 2 and 3, to which the conduit or penstock members 14 are attached.

Since the cylindrical follower element 12 of the gate leaf coincides with the circular fluidway 13 when the leaf is fully raised, it is apparent that smooth fluid flow, free of disturbances and hydraulic unbalances, will result at all times while the leaf is in the fully open position. However, when the leaf is lowered with fluid passing through the fluidway or when the leaf is raised from the closed position with unbalanced hydrostatic pressures on the upstream and downstream face thereof, there is a tendency for unbalanced pressures to be produced between the leaf and encasing housing members, a condition which results in vertical pressure forces, tending to force the leaf down, being imposed on the leaf. It is the balancing of these vertical pressure forces that is accomplished by our invention; and lest the importance of so doing be underestimated, there will be given comparative data listing the stem loads for a gate embodying the balancing feature and for its conventional prototype.

In the first means (Figs. 3, 4, and 5) by which the balancing of the vertical forces is attained, the upstream face 15 of the leaf 1 is placed in very close juxtaposition to the inside surface of the bonnet member 7, leaving only a small clearance 16 between the leaf and bonnet member 7.

This construction is essential so that fluid cannot readily flow upward through the clearance 16 and into the space 17 above, defined by the upper bonnets 7 and 8, upper bonnet cover 9, and the upper surface of the gate leaf 1. In addition a tubular element 18 is provided in the leaf 1, and connects the space 17 above the leaf with the fluid passageway through the cylindrical follower element 12. It will be noted also that the body members 2 and 3, and the lower bonnets 4 and 5, are of somewhat greater width than the leaf 1. These are the features that comprise our means for balancing the vertical forces which tend to develop when the leaf is raised or lowered with fluid passing through the fluidway 13. The air manifold 19 supplies air to the space 20 from which it is fed into the fluidway 13, when the gate is being raised or lowered, through the holes 21, and serves to eliminate vibration and surges during partial opening of the gate leaf 1, and, therefore, permits the assembly to function more smoothly.

On the diagrammatic Fig. 5, the conditions resulting from fluid flow with the leaf in the partially open position have been depicted in order that the functioning of our invention may be more readily and clearly understood. As the fluid passes beneath the leaf, the upstream edge of the cylindrical follower ring acts as a sharp crested weir, and because of the directional change of the fluid stream 22 in passing through the semi-elliptic opening, which is formed with the leaf in partially open position, the water flows downward and away from the underside of the cylindrical follower element. This downward deflection of fluid flow is also manifested on the bottom of the fluid stream 22 which deflects downward slightly in passing over the opening between the bodies 2 and 3. The body seat 23, however, acting as a sharp crested weir on the downstream body 3, together with the directional change of the fluid stream 22 causes the stream to lift away from the bottom of the fluidway 13 as shown. These features are the primary aspects of the transformation that takes place in the fluid stream when the leaf is partially open.

The secondary aspects or results of the fluid flow are these: a triangular shaped eddy or "roller" 24 is set up in front of the leaf and travels in a counter-clockwise direction, as indicated by the arrows; a semi-vacuum condition is induced beneath the top of the cylindrical element and in the triangular space behind the leaf—the numeral 25 designates this space; another eddy or "roller" 26 is set up between the fluid stream 22 and the bottom of the cylindrical element and travels in a clockwise direction, as indicated by the arrows; and a semi-vacuum condition is induced in the area 27 beneath the fluid stream 22. It is these resulting effects that tend to produce vertical forces which would add a downward pull on the leaf, unless a means were provided whereby they can be made to balance each other.

Inasmuch as the velocity of the "roller" 24 is not as great as that of the fluid stream, by the laws of hydraulics, the velocity head will be replaced by static head, resulting in an increased pressure. This increased pressure will tend to force fluid upward through the clearance space 16, between the leaf 1 and upper bonnet 7, and into the space 17 above the leaf. This same result is manifested upon pressures within the "roller" 26 resulting in an increased pressure in the space 28 beneath the cylindrical element. Inasmuch as this space beneath the leaf is in communication with the space 17 above the leaf through the clearance spaces 29 at the sides of the gate (Fig. 4), fluid will also tend to flow upward from the space 28 beneath the leaf into the space 17 above the leaf. However, the water which does enter the space above the leaf is drawn downward through the tubular element 18 by the semi-vacuum condition which exists at its lower termination. Since the area of the clearance space 16, plus the area of the spaces 29 at the sides of the leaf, does not equal the area of the tubular element 18, it is apparent that the pressure in the space 17 above the leaf and the pressure in the space 25 necessarily are the same; and, therefore, become the same, equalizing each other. On the bottom of the cylindrical element, because of the clearance spaces 30, the fluid pressure is readily equalized above and below the cylindrical surface. Therefore, since no unbalanced vertical forces exist on the leaf, only the weight of the leaf need be considered in the design of the hoist.

To illustrate the capacity for which it would be necessary to design the hoist and to illustrate the magnitude which this downpull would attain in the absence of our balancing means, let us assume a gate having a one hundred inch diameter fluidway and a lead twenty five inches thick, and operating under a hydrostatic pressure of one hundred pounds per square inch. Predicating the following results upon the foregoing data, the pressure acting downward upon the top of the leaf would be one hundred pounds per square inch over an area of twenty-five hundred square inches or 250,000 pounds. In addition, the partial vacuum, about five pounds per square inch, at the top of the fluidway through the leaf would add another 12,500 pounds; and if the clearances between the lower portion of the cylindrical element and the lower bonnets were small, the downward deflection of the water would add an impact load upon the cylindrical element, since the pressure above and below the cylindrical element would not be equalized. Thus there will be imposed upon the leaf vertical forces in excess of 262,500 pounds. The moving parts for a gate of the size mentioned would weigh about 40,000 pounds; therefore, a hoist capacity of seven and one-half of the actual requirements for moving parts would be necessary if a means were not provided to equalize the vertical pressure forces which actual tests and careful analysis have proved do exist. From this example the mechanical as well as the economic value of our invention can be well appreciated.

In the alternate design, illustrated in Figs. 6, 7, and 8, the same result is attained by somewhat different means. The reference numerals for the alternate construction, where identical parts or areas are being described, will be the same as in the first design. The principal differences in the two designs are that instead of having a tube through the leaf there is a series of holes 31 (Figs. 6 and 7) through the webs of the beam elements 32, and that the upper downstream bonnet member 8 and the upper portion of the downstream body 3 are swelled out to provide a space 33 between the leaf and the encasing wall.

Since the only function or fact which differs from the previously described design is the manner in which fluid which enters the space 17 above the leaf is withdrawn, the description of these phases and parts will not be repeated;

however, for the sake of comparison identical reference numerals will be used for the alternate design except where parts or elements differ in function.

The only difference in the manner that the alternate functions is this: fluid which enters the space 17 above the leaf is drawn downward into the space 33, through the holes 31 in the beam elements 32, and is discharged into the partial vacuum area 25 behind the downstream face of the leaf. It is apparent, since the area of the holes 31 is greater than that of the spaces which permit fluid to enter the space 17 above the leaf, that the pressures will become equalized as effectively as in the first design. It will be equally apparent, too, from the simplicity with which alterations in design can be made, that there exist many designs for balancing the vertical pressure forces within an encasing housing, that do not depart from the principle or spirit of our invention.

Inasmuch as the principle of seating as well as the arrangement for the parts thereof has been described in detail in the previous applications by Phillip A. Kinzie and Phillip A. Kinzie et al. which have been already cited, no further description of their function will be set forth herein; however, in order that their relationship in this invention will be understood, the principal parts will be enumerated herein.

As in former applications, rollers 34 are carried on dual oval-shaped roller carriages 35 (Figs. 2, 3, 4, 6, 7, and 13). A secondary set of rollers 36 is interposed between the leaf 1 (Figs. 3, 4, 6, and 7) and each of the roller carriages 35, and functions as the seating or unseating means. Links 37 (Figs. 4, 7, and 13) connect the rollers 34 and 36 in their respective sets. Dual twin toggles 38 (Figs. 2, 3, 6, and 9) are attached at their lower terminations to the shoes 39, which are slidably secured to the gate leaf 1. The upper terminations of the toggles 38 are attached to the crosshead 40, which also carries the roller carriages 35 on the trunnions 41 (Fig. 13) formed thereon. It is to the crosshead that the dual hoisting means connects for raising or lowering the gate leaf and the associated parts.

The downwardly extending stem element 42 on the nut tube 43 (Figs. 9 and 13) is received within a mating bore in the crosshead 40, and is prevented from rotating therein by the key 44. The crosshead is securely held on the stem element 42 by the nut 45, which engages the threaded portion 46 thereon. The upwardly extending portion of the stem element is secured to the nut tube 43 by the threads 47 and the weld 48, which transmits the torque reaction of the nut tube to the stem element 42 and prevents the intrusion of fluid into the reservoir space 49 within the nut tube 43. The lifting nut 50 (Figs. 9, 10, and 12) is received within a counterbore in the top portion of the nut tube 43 and is held therein by the threaded and welded collar 51. The key 52 prevents rotation of the lifting nut 50 within the counterbore. The bushing 53 (Figs. 9 and 13) guides the nut tube in the bonnet cover, and the packing 54 and gland 55 render a fluid tight joint suitable for the vertically moving nut tube.

The lifting nut 50 (Figs. 9, 10, and 12) receives the threaded portion 56 of the lifting stem 57, which has its upper shouldered portion 58 received within a counterbore in the castellated plug element 59. Radially extending lugs 60 (Figs. 10 and 12) on the lifting stem 57 are received within mating slots in the castellated plug element 59 and prevent rotation of the stem within the counterbore therein. The lifting stem is secured against axial motion by the shoulder 61 and by the cap 62, which is threaded on the castellated plug element 59 and which bears upon the top of the lifting stem. The castellated plug element 59 is threaded into and welded on the torque tube 63 which in turn has its lower termination (Fig. 9) threaded in, and welded to, the bevel gear hub 64. The bevel gear 65 is secured to bevel gear hub 64 by the studs 66, and is in mesh with the bevel pinion 67 (Fig. 2), which is keyed on the extending drive shaft of the motor and speed reducer unit 68. The torque tube 63, which is journaled in the bushing 69 (Fig. 9) in the hoist case cover 70, and the bevel gear hub extension 71, which is journaled in the hoist case 10 or 11, centralize the bevel gear hub 64. The packing 72 and gland 73 at the termination of the hub extension 71 render the hoist case oil tight.

The downward axial loads are transmitted into the hoist case and upper bonnet cover 9 through the ball thrust bearing 74, and the upward thrust is transmitted into the hoist case cover 70 through the thrust rings 75.

While in the foregoing only one stem unit has been described, it is to be understood that the stems are alike, except for a supplemental gear 76 (Fig. 2) on the bevel gear hub 64, which drives the limit switch and indication unit 77.

Oil is supplied to the interior of the hoist cases 10 and 11 through the covers 78, (Figs. 2, 3, and 6), and the oil level gages 79 give indication of the oil level therein. Oil is also supplied to the reservoir space 49 within the nut tube 43 by removing the eye-bolt 80 and cover 81 and pouring or pumping oil into the drilled hole 82 whence it flows outward into the reservoir space 49 through the drilled hole 83. The reservoir space 49 is filled with oil to the top of the lifting nut 50 with the gate leaf in the raised position as shown. Since the oil displaced by the lifting stem 57 becomes less when the gate leaf is lowered, a groove 84 (Figs. 10 and 12) is cut along the outer diameter of the lifting nut 50 and allows the space 49 to "breathe" as the gate leaf is raised or lowered.

From the foregoing description it will be apparent that when the motor is started rotation will be imparted to the bevel pinions 67, bevel gears 65, bevel gear hubs 64, torque tubes 63, and lifting stems 57, while the lifting nuts 50 and nut tubes 43 will not rotate, a condition that will cause the lifting nuts 50 to travel up or down the threaded portions 56 of the lifting stems 57 and in this manner raise or lower the crosshead 40 and the parts connected thereto. Thus simply and efficiently the gate leaf 1 is raised or lowered as desired.

In order that the design and economic features of this invention may be appreciated, the following enumeration of the salient features is given; first, there are only three parts of the stem unit which need be made of non-corrodible metal when the fluid within the valve is of a corrosive nature—the stem element 42, the nut tube 43, and the nut 45; second, the elements comprising the unit contain an integral oil reservoir which automatically lubricates the lifting stem 57; third, all the elements comprising the unit are simple and of moderate length, making their manufacture cheaper and their cost less; and fourth, the stem unit is non-rising in character, allowing minimum overhead room or crane clearances.

Whereas in the foregoing we have described the specific embodiments of our invention for the purpose of satisfying the patent statutes, it is, nevertheless, to be understood that in practicing the same, we may resort to any and all modifications falling within the scope of the appended claims defining the invention.

We claim:

1. In combination, a fluid-tight gate housing having a passageway therethrough, a gate leaf movable transversely of said passageway to open and close the same, means limiting the flow of fluid into the upper end of said housing and means affording free communication between said upper end and the downstream side of said gate leaf at the upper side of the stream of fluid flow through said passageway, said last mentioned means including a fluid flow area through said gate leaf and connecting the upper end of the housing with said passageway whereby vertically directed fluid pressure reactions on said leaf are substantially equalized to minimize the effort required to move said leaf.

2. In combination, a fluid-tight gate housing having a passageway therethrough, a gate leaf movable transversely of said passageway to open and close the same, means limiting the flow of fluid into the upper end of said housing, and means including a vertically disposed passage through said gate leaf above the fluid stream and affording free communication between regions directly above and below said gate leaf whereby vertically directed fluid pressure reactions on said leaf are substantially equalized to minimize the effort required to move said leaf.

3. In combination, a fluid-tight gate housing having a passageway therethrough, a gate leaf within said housing, and means suspending said leaf for movement transversely of said passageway to open and close the same, said gate leaf and housing being dimensioned to provide above the passageway a restricted clearance space therebetween adjacent the upstream face of said gate leaf and a space at each side of the passageway, means for supporting and guiding said leaf with respect to said housing and occupying a portion of each side space, and a fluid flow connection between regions above and below said gate leaf of substantially greater area than the total area of said spaces whereby adjustment is effected between vertically directed fluid pressure reactions on said gate due to the flow of fluid through said passageway thereby minimizing the tension on said leaf suspending means during opening and closing movements of said gate leaf.

4. In combination in a valve, a fluid-tight casing having a fluid pressure flow way therethrough, a reciprocable gate including a closure for the flow way and also having an aperture for registration therewith, and means for equalizing fluid pressures within said aperture with respect to fluid pressures within said housing at opposite ends of said gate whereby during opening and closing movement the gate opening and closing effort is required to overcome substantially only the static weight of the gate.

5. In combination, a fluid-tight gate housing having openings in opposite walls thereof and adapted for connection between inlet and outlet conduits for the passage of fluid therethrough, a gate body within said housing and having a sealing portion and a throughway for registration with said openings, said gate body being movable transversely of said openings to regulate the flow of fluid whereby during opening and closing movements of said body the fluid flow against and within the throughway results in unbalanced fluid pressure reactions on said body, said sealing portion comprising a plurality of web members, and means equalizing said pressure reactions including fluid passage areas through said web members establishing communication between pressure regions above and below said sealing portion.

6. In combination, a fluid-tight gate housing having a passageway for the flow of fluid therethrough, a closure member within said housing and movable transversely of said passageway into open and closed positions, said closure member being so dimensioned relative to the housing as to provide laterally disposed clearance areas therebetween whereby at intermediate positions of said member a fluid pressure is induced within the upper end of said housing in excess of the pressure beneath said closure member, and means equalizing said pressures comprising a connection communicating with the upper end of said housing and with the region adjacent said fluid stream beneath said closure member, said connection affording a fluid flow area exceeding said laterally disposed clearance areas.

7. In a gate valve, a fluid tight housing providing a passageway for the flow of fluid therethrough, a closure member within said housing, means suspending said member for movement transversely of said passageway whereby at intermediate positions of said member the flow of fluid against and beneath the member induces vertical pressure forces acting on the upper and lower ends of said member which increase the load on said suspension means, and means substantially preventing such increased loading which includes means restricting the clearance between the housing and the upstream face of said member and means within said member providing equalization of the pressure forces to which said ends of the member are subjected.

8. A valve comprising a gate member and an encasing housing, means suspending said member for movement within said housing transversely of the valve passageway, said member having bulkhead and fluidway portions and being subject to unbalanced pressure forces tending to increase the loading on said suspension means due to fluid flowing against said member in passing through said fluidway, and means establishing a balance between said forces to prevent such increased loading which includes means providing restricted and enlarged clearances respectively between the housing and upstream and downstream faces of said bulkhead portion, and an enlarged clearance between the housing and said fluidway portion.

PHILLIP A. KINZIE.
WARREN H. KOHLER.